May 29, 1962
J. H. TAYLOR
3,036,823
ROTARY KILN
Filed June 18, 1959
3 Sheets-Sheet 1
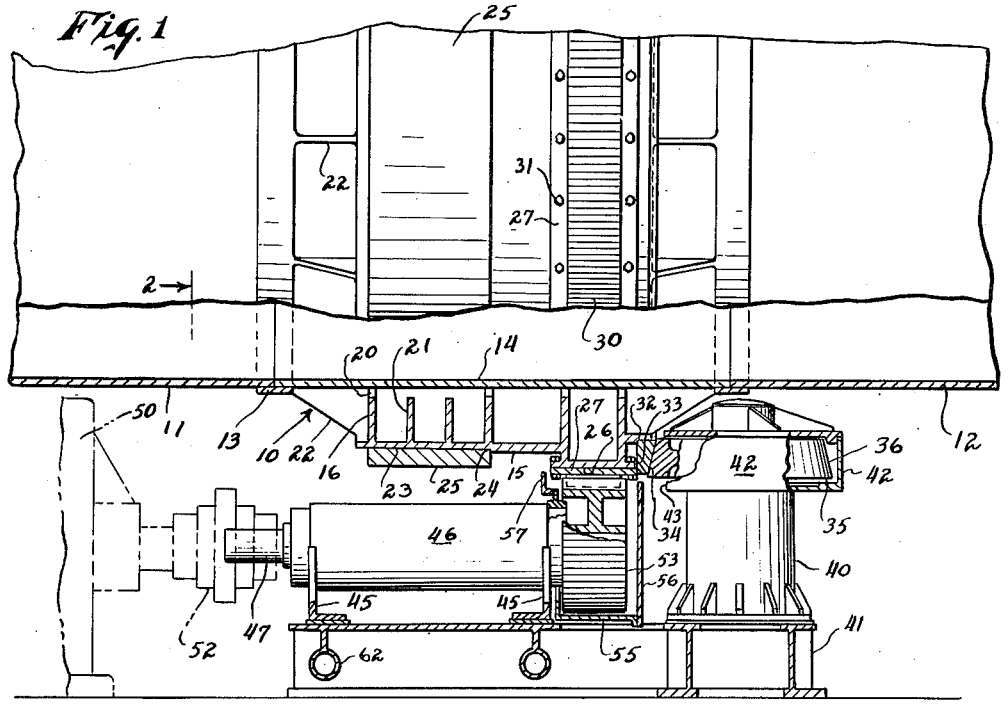
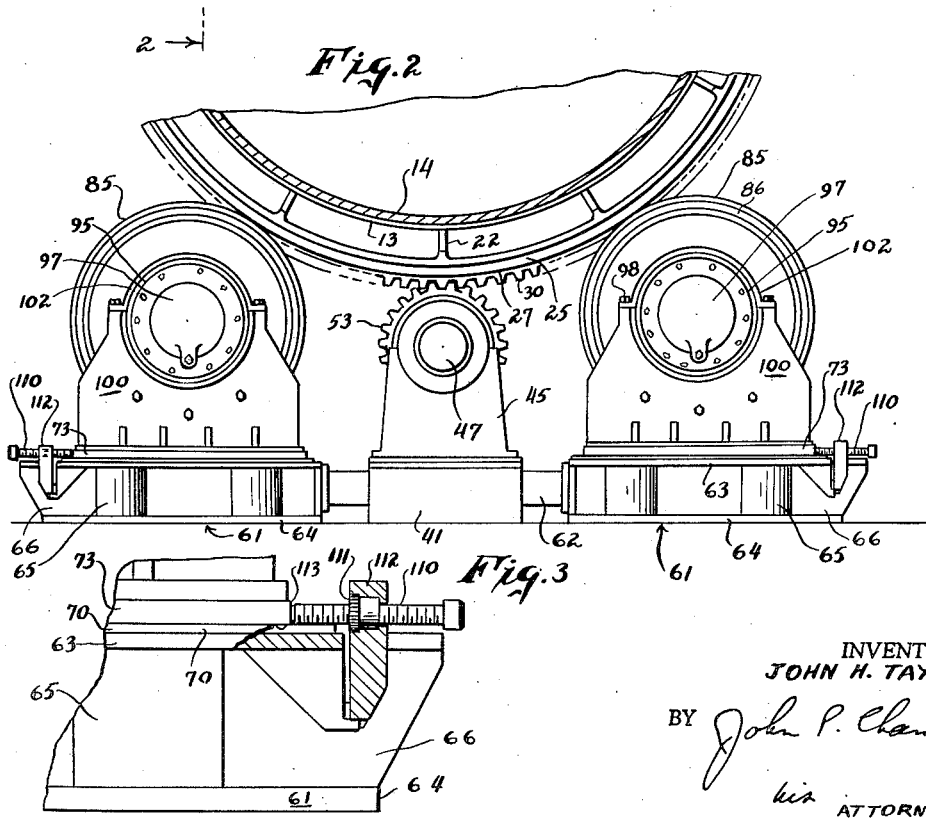
INVENTOR.
JOHN H. TAYLOR
BY John P. Chandler
his ATTORNEY May 29, 1962 J. H. TAYLOR 3,036,823
ROTARY KILN
Filed June 18, 1959 3 Sheets-Sheet 2

INVENTOR.
JOHN H. TAYLOR
BY John P. Chandler
his ATTORNEY

May 29, 1962 J. H. TAYLOR 3,036,823
ROTARY KILN

Filed June 18, 1959 3 Sheets-Sheet 3

INVENTOR.
JOHN H. TAYLOR
BY *John P. Chandler*
his ATTORNEY

United States Patent Office 3,036,823
Patented May 29, 1962

3,036,823
ROTARY KILN
John H. Taylor, Ferguson, Mo., assignor, by mesne assignments, to Simon Srybnik, Brooklyn, N.Y.
Filed June 18, 1959, Ser. No. 821,170
4 Claims. (Cl. 263—33)

This invention relates to rotary kilns and relates more particularly to a novel drive and thrust assembly including a specially formed shell which is incorporated into and becomes a part of the cylindrical shell structure of the kiln which is journalled for rotation at a slight angle to the horizontal.

An important object of the invention is to provide a double shell cylindrical structure which carries a steel tire and steel girth gear and which is so formed as to assure that the pitch diameter of the gear is concentric with the axis of roation and this structure which carries the highly concentrated loads has a uniformity of wall thickness which has not been possible to achieve in prior structures employing cast steel tires mounted on single wall shells.

Another object of the invention is to so form this double shell structure, on which both the tires and the girth gear are mounted, as to enable these two mounting surfaces to be machined in one set-up on the boring mill so as to assure absolute concentricity.

A further object of the invention is to provide a structure with such extreme strength and rigidity so as to permit the use of a lighter weight forged steel tire and forged steel girth gear than are normally used and the assured concentricity of gear and tires very considerably reduces wear and consequent trouble in these kiln parts.

Yet another object of the invention is to provide improved means of absorbing the thrust load incident to the slope of the kiln. One method formerly used was to adjust the supporting trunnion rollers in such a fashion that there was an angular relationship between the axis of the supporting trunnion rollers and the axis of the tire so that as the kiln was rotated this axial displacement tends to feed the kiln uphill until slippage impends, when the kiln would slide back downhill until friction again reasserted itself and the uphill climb was repeated. To guard against over-travel, thrust rollers were placed one above and one below the tire, which exercised axial restraint.

In accordance with the present invention there is provided a thrust roller mechanism which absorbs all of the thrust load incident to the slope of the kiln. The horizontal rotating member of this mechanism is supported both above and below the line of action along which the thrust load incident to the slope of the kiln is translated, to the horizontal rotating member. The unit is so proportioned, designed, and mounted that it is capable of absorbing all the thrust load at all times and at no times are the trunnion rollers depended upon to absorb any part of the thrust load.

A still further object of the invention is to provide a self-aligning arrangement for the trunnion roller supports which will assure the axis of the roller being parallel with the axis of the kiln at all times. This feature of automatic self-alignment, by eliminating manual adjustment assures that at all times the axial relationship of tire and roller is most favorable for smooth running, equal distribution of load over the entire face of roller and tire, and the reduction of grinding and wear. There are no forces introduced between the relatively broad meeting faces of the tire and roller that will alter the true cylindrical shape of either member of the pair. This self-aligning feature is accomplished by providing a relatively broad flat bed which is movable toward and away from the central axis and this bed has a central circular recess which receives a swivel element formed with a roller base frame to allow said frame and its roller to freely swivel so that said broad meeting faces are always in full line engagement. The foregoing features are incorporated into a kiln which is otherwise of conventional design without altering the general factors and arrangements which have been accepted in the art and have been found to be eminently satisfactory. The diameter, length, slope, retention time and the revolutions per minute are calculated in the usual manner. The improvements of the present invention, however, give a smooth running, quiet, more efficient kiln which will occasion less down time nad less maintenance supervision.

The present invention is designed primarily for kilns of the type now commonly used in the cement, lime and other chemical industries, but the improved drive and thrust assembly and double shell cylindrical structure carrying the steel tire and steel girth gear may be used with equal facility on a large variety of rotary dryers and coolers and also on rotary roasters, retorts, calciners and the like.

In the drawings:

FIG. 1 is a broken longitudinal section taken through a kiln and embodying a drive and thrust assembly of the present invention.

FIG. 2 is a broken section taken on line 2—2 of FIG. 1.

FIG. 3 is an enlarged broken xiew, partially in section, showing the adjusting means for the supporting bed for the roller base frame.

Figure 4:
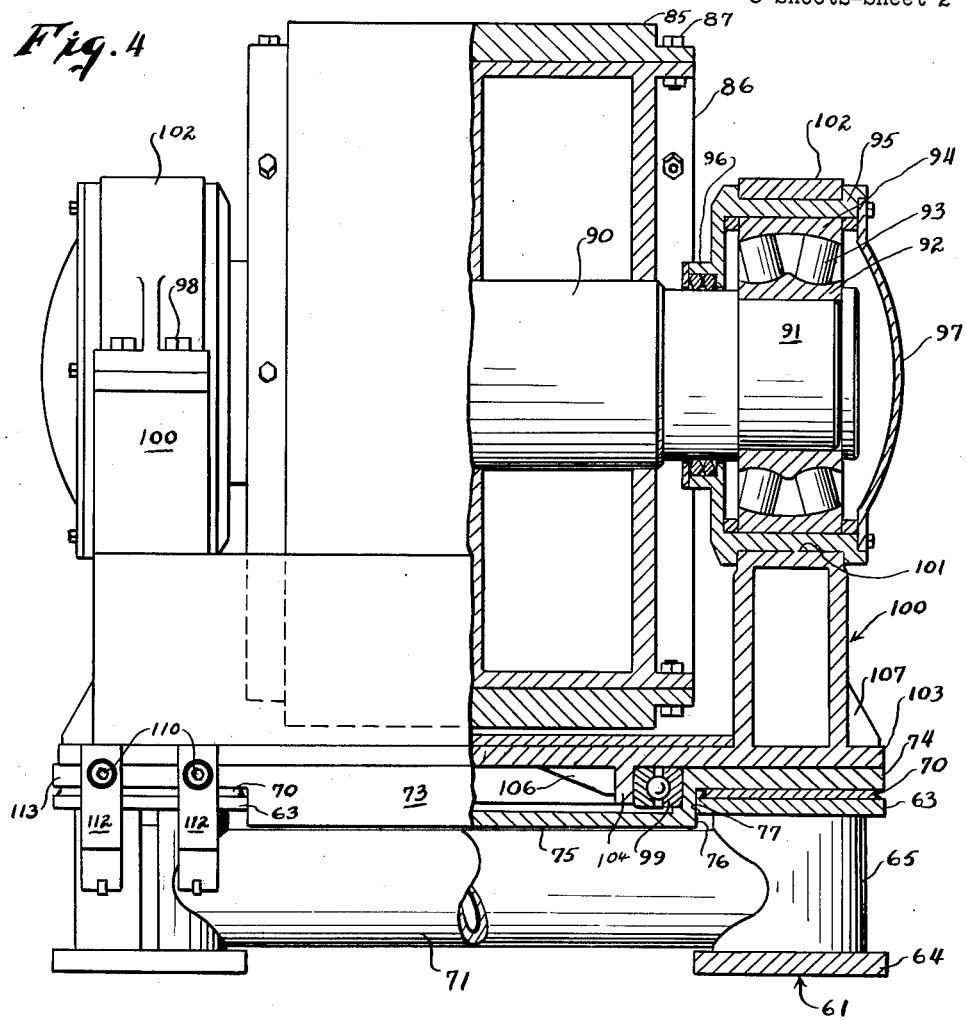
FIG. 4 is a side elevation, partially in section, of the trunnion roller assembly.

FIG. 1 shows a broken side elevation of a rotary kiln or the like which may be of considerable length and is usually made up in a plurality of sections including a tire and drive section 10 which may comprise a hollow cylindrical structure positioned in axial alignment with adjoining sections 11 and 12 which are joined therewith by annular rings 13 or otherwise. In most installations the axis of the rotating kiln will be inclined from the horizontal at a slope of about one-half inch per foot, although this slope is not indicated in FIG. 1 since it would be almost imperceptible in so short a section. Kiln section 12 is at the downhill end and section 11 at the uphill end.

Cylindrical structure 10 includes an innner shell 14 and an outer shell 15 having a plurality of radial sections 16 extending inwardly to the inner shell with spaced openings 20 around the periphery of the latter and with radial sections 21 which do not extend inwardly to the inner shell. The outer shell is reinforced by means of longitudinal webs 22 welded to the inner shell. The outer shell is concentric with the inner shell. This cylindrical structure is an inseparable assembly of parts permanently joined together by welding and a structure of this general character is generally referred to in the art as a "weldment." All members of this structure are so proportioned that it is sufficiently strong to resist all stresses which may be imposed on it when it becomes a part of the elongated cylindrical structure of the kiln. After assembly, the cylindrical structure 10 is machined to a true cylindrical shape of predetermined diameter and length with the planes of its opposed ends perpendicular to the axis. This machining includes the forming of an annular seat 23, with a shoulder 24 at one end thereof, to receive a fully machined heat-treated forged steel tire 25, rectangular in cross section.

The outer shell 15 is formed with a second seat 26 of greater diameter than seat 23 which receives a girth gear 27, provided with integrally formed involute spur teeth 30 which is secured on the seat as by bolts 31 passing through flanges at opposed ends of the seat. The outer shell is also formed with an annular seat 32 for a fully machined heat treated forged steel thrust tire 33 having a diagonal face 34 inclined in the direction shown, to transfer the thrust load, incident to the slope of the kiln, to a thrust roller 35 having a diagonal thrust face 36 inclined complementary to thrust face 34. Thrust roller 35 is journalled for rotating movement on a vertical axis, preferably in spherical bearings (not shown) positioned within a housing 40 mounted in fixed relation on a base frame 41 formed principally of structural beams and mounted on a concrete foundation indicated by the ground line. Thrust roller 35 is enclosed within a housing 42 having at its inner end an opening 43 adjacent tire 33 of sufficient length to expose a desired portion of diagonal thrust face 36 to allow its engagement with the thrust tire.

A plurality of angle brackets 45 are centrally mounted on base frame 41 which support a bearing housing 46 for a pinion shaft 47. Spherical bearings (not shown) are positioned at opposite ends of this housing. Drive means for the shaft include a motor (not shown), a gear reducer 50 and a flexible coupling 52, all shown in broken lines. A driving pinion 53 keyed to shaft 47 engages the teeth 30 of the girth gear 27 The pinion is enclosed within a housing including sections 55, 56 and 57.

The steel tire 25 is supported by two trunnion roller assemblies, each of which is supported by a base frame section 61. The two base frame sections are maintained in fixed, spaced relation to central frame 41 by tubular cross-frame members 62. Each frame 61 has two supporting structures (FIG. 4) which are spaced longitudinally with reference to the axis of rotation of the kiln and each supporting structure includes upper and lower plates 63 and 64 extending transversely of said axis, said plates being maintained in this spaced relation by vertical columns 65 and the structure is reinforced by vertical webs 66 (FIG. 2). A machined pad 70 of predetermined thickness is welded on the upper surface of upper plate 63. The two supporting structures are rigidly maintained in this spaced relation by tubular members 71.

Figure 7:
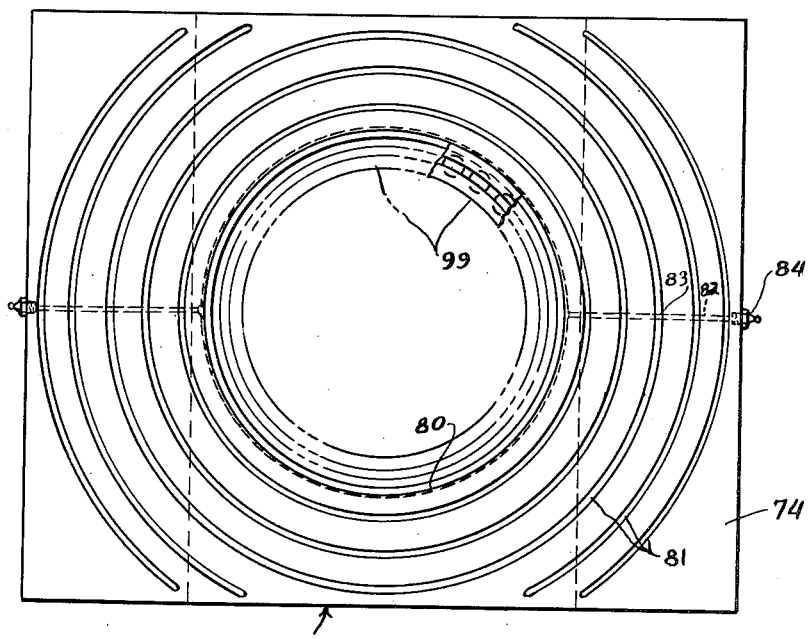
FIG. 7 is a plan view of the supporting anti-friction plate.
Figure 8:
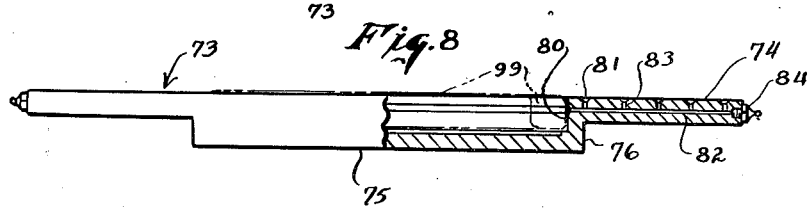
FIG. 8 is a side elevation thereof, partially in section.

A supporting plate 73 with an anti-friction surface, shown in FIGS. 7 and 8, has opposed end sections 74 which are mounted for sliding movement, transversely of the kiln axis, on the upper faces of pad 70. This broad supporting bed has a downwardly recessed central section 75 defined at opposed ends by shallow vertical walls 76 which engage the opposed inner faces 77 (FIG. 4) of upper plates 63, which faces act as tracks to guide the supporting bed in its travel towards and away from the kiln axis. The supporting bed further has a circular recess 80 centrally disposed and extending downwardly from its upper face. Also on this upper face are a plurality of concentric grease-receiving grooves 81 to which grease is fed by a through bore 82 extending through one of the end sections 74 and connected with the grooves for feed holes. A closure cap 84 closes the oil feed opening.

The tire 25 is supported by two trunnions 85, each of which is carried on a trunnion roller 86 and secured by bolts 87. The roller is carried on a trunnion shaft 90, the ends 91 of which are of reduced diameter and receive the inner race 92 of a bearing having spherical rolling elements 93. The outer race 94 is mounted in a bearing retainer 95 having a closure 96 at its inner end with suitable packing, and closure 97 at its outer end.

Figure 5:
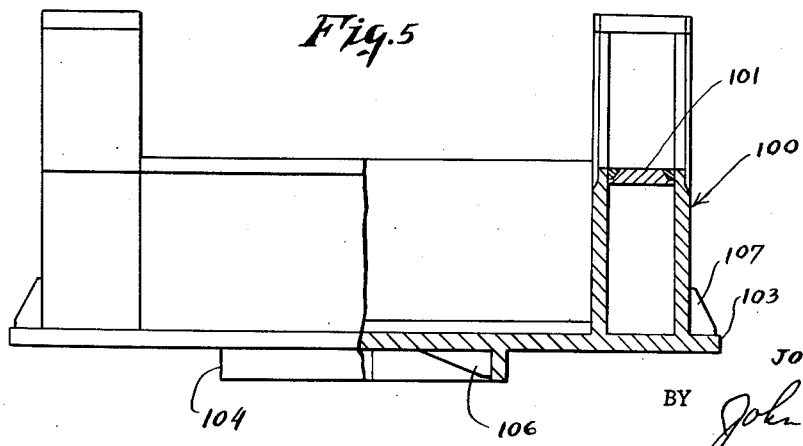
FIG. 5 is a side elevation, partially in section, of the roller base frame.
Figure 6:
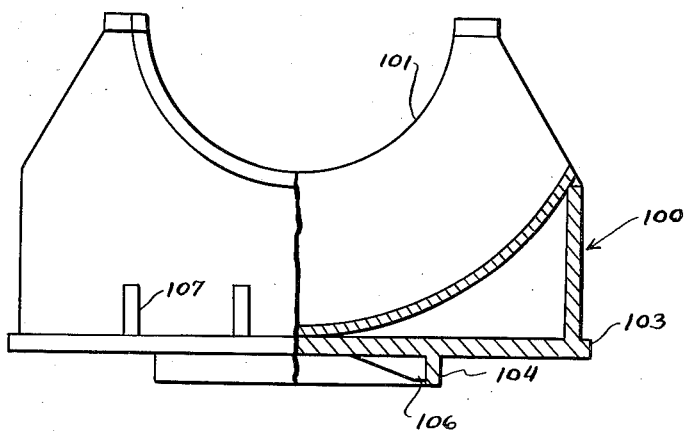
FIG. 6 is an end elevation thereof.

The bearing retainers are mounted in roller base frame 100 (FIGS. 5 and 6), each of which has a concave upper seat 101 in its double end walls to receive the bearing retainer which is secured therein by a curved retaining plate 102 secured to roller base frame 100 by bolts 98. This roller base frame further has a base section 103 having on its lower surface a downwardly extending circular flange 104 which is received in circular recess 80 in the anti-friction plate. This provides a swivel mounting for the roller base frame which is supported for rotation on lubricated surface 74 of the anti-friction plate, so that regardless of any wear on any of the rolling surfaces the rollers may swivel to provide perfect meeting contact. The roller base weldment is reinforced by inner and outer webs 106—107. The inner diameter of recess 80 is greater than the outer diameter of annular flange 104 and this recess receives a roller bearing 99 to reduce the frictional load on walls 104 generated by the horizontal component of weight load of the kiln.

Movement of the anti-friction plate 73, and the trunnion roller assembly which it carries, toward and away from the kiln axis, is effected by a screw arrangement. This comprises a screw 110 carried in a bushing 111 mounted in a bracket 112 secured to base frame 61. As shown in FIG. 4 at the left, two of these screws are provided at each end of the base frame and they engage the outer longitudinal edges 113 of supporting anti-friction plate or bed 73. In order to reduce the likelihood of one screw momentarily taking all the load, the application of force by each of the two screws can be equalized by providing, instead of two fixed brackets 112, a single bracket pivoted on the base frame which carries both screws.

During normal operation of the kiln, the tire 25 and the trunnions 85 quite naturally wear which causes the kiln and the girth gear 27 to move closer to pinion 53. Eventually this would leave no clearance and the gear teeth would bind. By advancing all eight screws 110, the trunnions are moved closer to the kiln axis, thereby raising said axis and assuring proper clearance for the gear teeth. This adjustment can be made without prejudice to the axial alignment of the rollers with the center line of the kiln and no particular skill is required to make the adjustment.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. In a rotary kiln or the like having an elongated cylindrical member rotatable on a substantially horizontal axis, said member being provided with a tire and drive section comprising inner and outer cylindrical shells rigidly joined together, the outer shell being formed with a plurality of annular seats, a tire, a toothed girth gear, and a thrust tire having a diagonal thrust face, secured on said seats, a base frame, a pair of trunnion roller assemblies supporting the tire and arranged in relatviely spaced relation with their axes parallel with each other, a relative broad bed supporting each of said assemblies mounted on the frame for sliding movement toward and away from the kiln axis, screws journalled in the base frame for moving the outer edge of said bed toward the kiln axis to an adjusted, fixed position, said bed having lubrication means for its upper surface and having a circular recess extending downwardly from said upper surface, a roller base frame supporting each trunnion roller assembly carried on said upper surface and having a circular flange extending into said recess and being free to swivel thereon, and roll-bearings between the flange and the walls of the recess, a thrust roller journalled on the frame on a vertical axis and provided with a thrust face inclined complementary to and which engages the face of the thrust tire, a driving pinion journalled on the frame in vertical alignment with the kiln axis and whose teeth engage and drive the girth gear, and means for rotating the pinion.

2. A trunnion roller assembly for supporting a generally horizontal cylinder for rotative movement and including a pair of trunnion rollers arranged in spaced relation with their axes parallel with each other, a frame, an anti-friction plate supporting each of said rollers mounted on the frame for sliding movement toward and away from the kiln axis, screws journalled in the base frame urging each side of the anti-friction plate toward the kiln axis to an adjusted, fixed position, said plate having a circular recess extending downwardly from its upper surface, and a roller base frame supporting each trunnion roller carried on said upper surface and having a circular flange extending into said recess and being free to swivel thereon.

3. The invention according to claim 2 wherein roller bearings are positioned between said flanges and the walls of the recess.

4. The invention according to claim 2 wherein lubrication means are provided on the upper surface of the plate.

References Cited in the file of this patent

UNITED STATES PATENTS

| | | |
|---|---|---|
| 481,885 | Aiken et al. | Aug. 30, 1892 |
| 714,616 | Snelus | Nov. 25, 1902 |
| 1,188,567 | Singer | June 27, 1916 |
| 2,260,321 | How | Oct. 28, 1941 |
| 2,521,731 | Kennedy | Sept. 12, 1950 |
| 2,570,082 | Traylor | Oct. 2, 1951 |

FOREIGN PATENTS

| | | |
|---|---|---|
| 640,130 | Great Britain | July 12, 1950 |